United States Patent
Akutsu et al.

(10) Patent No.: US 10,189,637 B2
(45) Date of Patent: Jan. 29, 2019

(54) CONTAINER HAVING EXCELLENT SLIPPING PROPERTY FOR FLUID CONTENTS

(71) Applicant: TOYO SEIKAN GROUP HOLDINGS, LTD., Tokyo (JP)

(72) Inventors: Yosuke Akutsu, Yokohama (JP); Shinya Iwamoto, Yokohama (JP)

(73) Assignee: TOYO SEIKAN GROUP HOLDINGS, LTD., Tokyo (JP)

( * ) Notice: Subject to any disclaimer, the term of this patent is extended or adjusted under 35 U.S.C. 154(b) by 611 days.

(21) Appl. No.: 14/763,268

(22) PCT Filed: Feb. 7, 2014

(86) PCT No.: PCT/JP2014/052879
§ 371 (c)(1),
(2) Date: Jul. 24, 2015

(87) PCT Pub. No.: WO2014/123217
PCT Pub. Date: Aug. 14, 2014

(65) Prior Publication Data
US 2015/0353271 A1    Dec. 10, 2015

(30) Foreign Application Priority Data

Feb. 8, 2013 (JP) ................ 2013-023468

(51) Int. Cl.
*B65D 85/72* (2006.01)
*A47G 19/18* (2006.01)
(Continued)

(52) U.S. Cl.
CPC ............ *B65D 85/72* (2013.01); *A47G 19/18* (2013.01); *B65D 1/0207* (2013.01);
(Continued)

(58) Field of Classification Search
CPC .... B65D 1/0215; B65D 85/72; B65D 1/0207; B65D 2231/005; B65D 23/02;
(Continued)

(56) References Cited

U.S. PATENT DOCUMENTS 6,427,826 B1 *   8/2002   Li ................... B65D 23/0814
                                                           198/500
8,535,779 B1 *   9/2013   Smith .................. B65D 23/02
                                                           428/141
(Continued)

FOREIGN PATENT DOCUMENTS

GB    1141667 A   1/1969
JP    60-34320 A  2/1985
(Continued)

OTHER PUBLICATIONS

Communication dated Sep. 28, 2016 from the European Patent Office in counterpart Application No. 14748619.5.
(Continued)

*Primary Examiner* — Yan Lan
(74) *Attorney, Agent, or Firm* — Sughrue Mion, PLLC

(57) ABSTRACT

A container for containing fluid substance as a content, wherein a container surface that comes in contact with the content is formed of a resin composition that contains a forming-resin and an immiscible-liquid that is immiscible with the fluid substance. The container has markedly improved slipping property for the fluid contents and can be easily produced.

8 Claims, 3 Drawing Sheets

(51) Int. Cl.
*C08J 7/06* (2006.01)
*B65D 1/02* (2006.01)
*B65D 23/02* (2006.01)
*B65D 65/38* (2006.01)
*B65D 65/42* (2006.01)
*B65D 23/04* (2006.01)

(52) U.S. Cl.
CPC ........... *B65D 1/0215* (2013.01); *B65D 23/02* (2013.01); *B65D 23/04* (2013.01); *B65D 65/38* (2013.01); *B65D 65/42* (2013.01); *C08J 7/065* (2013.01); *B65D 2231/005* (2013.01)

(58) Field of Classification Search
CPC .... B65D 23/04; B65D 23/0807; B65D 65/38; B65D 65/42; A47G 19/18; C08J 7/065
See application file for complete search history.

(56) References Cited

U.S. PATENT DOCUMENTS

| | | |
|---|---|---|
| 2010/0092621 A1 | 4/2010 | Akutsu et al. |
| 2012/0193370 A1 | 8/2012 | Erspamer et al. |
| 2014/0147627 A1 | 5/2014 | Aizenberg et al. |
| 2014/0187666 A1 | 7/2014 | Aizenberg et al. |
| 2014/0290731 A1 | 10/2014 | Aizenberg et al. |
| 2014/0290732 A1 | 10/2014 | Aizenberg et al. |

FOREIGN PATENT DOCUMENTS

| | | | |
|---|---|---|---|
| JP | 6-99481 A | | 4/1994 |
| JP | 6-345903 A | | 12/1994 |
| JP | 2007-284066 A | | 11/2007 |
| JP | 2008-222291 A | | 9/2008 |
| JP | 2009-214914 A | | 9/2009 |
| JP | 2010-214910 A | | 9/2010 |
| JP | 2012-521935 A | | 9/2012 |
| JP | 5343972 | * | 8/2013 |
| WO | 2010/029968 A | | 3/2010 |
| WO | 2010/103985 A1 | | 9/2010 |
| WO | 2012/100099 A1 | | 7/2012 |
| WO | 2012/137755 A1 | | 10/2012 |
| WO | 2014/010534 A1 | | 1/2014 |

OTHER PUBLICATIONS

International Search Report for PCT/JP2014/52879 dated May 20, 2014 [PCT/ISA/210].

* cited by examiner

CONTAINER HAVING EXCELLENT SLIPPING PROPERTY FOR FLUID CONTENTS

CROSS REFERENCE TO RELATED APPLICATIONS

This application is a National Stage of International Application No. PCT/JP2014/052879, filed on Feb. 7, 2014, which claims priority from Japanese Patent Application No. 2013-023468, filed on Feb. 8, 2013, the contents of all of which are incorporated herein by reference in their entirety.

TECHNICAL FIELD

This invention relates to a container having excellent slipping property for fluid content and, particularly, for highly viscous fluid contents.

BACKGROUND ART

Plastic containers are easy to form, can be inexpensively produced and have, therefore, been widely used in a variety of applications. Specifically, an olefin resin container of the shape of a bottle of which the inner wall surface is formed by using an olefin resin such as low-density polyethylene and which is formed by direct blow-forming, has been desirably used as a container for containing viscous slurry-like or paste-like fluid contents such as ketchup and the like from such a standpoint that the content can be easily squeezed out.

Further, the bottles containing highly viscous fluid contents are, in many cases, preserved in an inverted state to quickly discharge the contents or to use the contents to the last drop without leaving them in the bottle. It is, therefore, desired that when the bottle is inverted, the viscous content quickly falls down without adhering or staying on the inner wall surface of the bottle.

To satisfy such requirements, for example, a patent document 1 proposes a bottle of a multilayer structure of which the innermost layer is formed from an olefin resin having an MFR (melt flow rate) of not less than 10 g/10 min.

The innermost layer of this multilayer structure bottle has excellent wettability for the oily content. Therefore, if the bottle is inverted or is tilted, then the oily content such as mayonnaise or the like falls down spreading along the surface of the innermost layer and can be completely discharged without adhering or remaining on the inner wall surface of the bottle (on the surface of the innermost layer).

As for the bottles for containing viscous non-oily contents in which plant fibers are dispersed in water like ketchup, a patent document 2 and a patent document 3 are disclosing polyolefin resin bottles having an innermost layer which is blended with a saturated or unsaturated aliphatic amide as a lubricating agent.

The above patent documents 1 to 3 are all trying to improve slipping property of the plastic containers for the contents based on the chemical compositions of the thermoplastic resin compositions forming the inner surfaces of the containers, and are achieving improvements in the slipping property to some extent. However, limitation is imposed on improving the slipping property due to limitation on the kinds of the thermoplastic resins that are used and on the additives, and striking improvement has not been achieved yet.

On the other hand, a patent document 4 is proposing a packing material of a composition comprising 100 parts by weight of a polyolefin resin blended with an additive having an HLB of not more than 5.0 in an amount in a range of 0.3 to 3 parts by weight.

The packing material of the patent document 4 exhibits excellent parting property relative to emulsified contents such as chocolate creams and custard creams. Namely, the packing material permits emulsified contents to adhere little and alleviates such an inconvenience that the content adheres in large amounts to the inner surface of, for example, a lid member.

According to the study by the present inventors, however, it was found that the container formed from such a composition is not still capable of exhibiting slipping property to the fluid contents such as sauce and the like.

Further, the present inventors have previously proposed a packing container filled with a content, wherein at least part of the surface that comes in contact with the content is a liquid-permeable surface which holds a liquid different from the content (Japanese Patent Application No. 2012-157744).

This container exhibits very improved slipping property to the fluid contents such as ketchup, sauce, mayonnaise and the like accompanied, however, by a problem in that after the container is formed, the liquid must be applied to the portion that comes in contact with the content. Therefore, a further improvement is necessary.

PRIOR ART DOCUMENTS

Patent Documents

Patent document 1: JP-A-2007-284066
Patent document 2: JP-A-2008-222291
Patent document 3: JP-A-2009-214914
Patent document 4: JP-A-6-345903

OUTLINE OF THE INVENTION

Problems that the Invention is to Solve

It is, therefore, an object of the present invention to provide a container that has markedly improved slipping property for the fluid contents and that can be easily produced.

Means for Solving the Problems

The present inventors have conducted experiments extensively concerning the slipping of the fluid contents on the container wall surface. As a result, the inventors have discovered the fact that in a container formed by using a resin composition blended with a liquid immiscible with the fluid content, the liquid segregates on the surface of the container and works as a lubricating layer enabling excellent slipping property to be expressed, and have thus completed the present invention.

That is, according to the present invention, there is provided a container for containing fluid substance as a content, wherein a container surface that comes in contact with the content is formed of a resin composition that contains a forming-resin and an immiscible-liquid that is immiscible with the fluid substance.

In the present invention, the following embodiments can be preferably employed.

(1) The covering ratio F with the immiscible-liquid is not less than 0.26, the covering ratio F being represented by the following formula (1), $$F=(\cos\theta-\cos\theta_B)/(\cos\theta_A-\cos\theta_B)$$

wherein θ is a water contact angle on the container surface formed of the resin composition, $\theta_A$ is a water contact angle on the immiscible liquid, and $\theta_B$ is a water contact angle on the forming-resin;

(2) The resin composition contains the immiscible liquid in an amount of not less than 3% by weight;

(3) When the container surface formed of the resin composition is measured for its shape by using an atomic force microscope, dents that are denting over a scanning range of 100 μm×100 μm are observed, and in a binary image of high portions (protuberances) and low portions (dents) with the center surface as reference converted from the surface profile that is obtained, the average area of protuberances over the scanning range is not less than 50 μm²;

(4) In the surface shape profile obtained by scanning the range of 100 μm×100 μm by using the atomic force microscope, the container surface formed of the resin composition has a mean square surface roughness RMS represented by the following formula (2), $$\text{RMS} = \sqrt{\frac{1}{n}\sum_{i}^{n}(Z(i) - Z_{ave})^2} \quad (2)$$

wherein n is a number of data points,

Z(i) is a Z value at each of the data points, and

Zave is an average value of all Z values, in a range of 80 nm to 200 nm;

(5) The container, has a multilayered structure on condition that the container surface that comes in contact with the content is formed of the resin composition;

(6) Polyolefin is used as the resin for forming;

(7) The fluid substance used as the content has a viscosity at 25° C. of not less than 100 cps;

(8) The fluid substance used as the content is a non-emulsifying aqueous substance;

(9) The non-emulsifying aqueous substance is a ketchup or sauce;

(10) A silicone oil, a glycerin fatty acid ester, a fluidized paraffin or an edible fat and oil is used as the immiscible liquid; and

(11) The resin composition is, further, coated with an immiscible liquid.

In the invention, the fluid substances stand for those of which the shape easily varies when a force is exerted on them in their stationary state, and excludes gelatinous materials such as some kinds of yogurts and custard puddings or those that retain their shapes to some extent in their stationary state, such as creams, butter and cheese.

Effects of the Invention

In the container of the present invention for containing fluid substance as a content, a great feature resides in that at least the inner surface of the container that comes in contact with the content is formed of a resin composition that contains a forming-resin and a liquid (often called lubricating liquid) having no affinity to the fluid substance (i.e., fluid content).

That is, the inner surface of the container is formed by using the resin composition that contains lubricating liquid and, therefore, exhibits excellent slipping property for the highly viscous fluid contents such as sauce and mayonnaise as will be demonstrated in Examples appearing later. For example, if the container such as bottle is held in an inverted state, the content falls down in short periods of time. Besides, the content is effectively prevented from staying being adhered on the container inner surface and can, therefore, be effectively taken out from the container.

Further, for imparting lubricating property, the lubricating liquid is used being mixed with the forming-resin in advance obviating, therefore, the need of applying the lubricating liquid after the container has been formed and hence providing advantage in producing the containers.

Moreover, the inner surface of the container is formed by using the resin composition that contains the lubricating liquid. Therefore, the innermost layer is firmly adhered to the neighboring layer of the container and is free from the probability of peeling off despite of repeating the squeezing operation, offering safety to a very high degree.

BRIEF DESCRIPTION OF THE DRAWINGS

FIGS. 2(a) and 2(b) are views of surface shapes on the inner surface of a container (Comparative Example 1) formed by using a resin composition without containing the lubricating liquid as measured by using the atomic force microscope.

FIGS. 3(a) and 3(b) are views of surface shapes on the inner surface of a container (Comparative Example 5) formed by using a resin composition of which the surface has not been sufficiently coated as measured by using the atomic force microscope.

BEST MODES FOR CARRYING OUT THE INVENTION

<Principle of the Invention>

The container of the present invention has an inner surface that is formed by using a resin composition containing a lubricating liquid (i.e., a liquid immiscible with the fluid substance contained in the container) and, therefore, exhibits excellent slipping property for the fluid substance (fluid content). This fact was discovered as a phenomenon as a result of extensive experiments. Though not yet clarified, the reasons are construed by the inventors to be as described below.

That is, if a container is formed by using a resin composition containing a lubricating liquid which is a liquid, the lubricating liquid separates in phase away from the resin component as the temperature decreases as a result of shaping (forming) the resin composition into the container, and the liquid is partly exposed on the surface. As a result, the inner surface of the container is maintained in a state of being coated with the lubricating liquid that is exposed. Thus excellent slipping property for the fluid content is exhibited by the lubricating liquid that is exposed on the inner surface of the container.

If, for example, the inner surface of the container is formed of an olefin resin instead of the lubricating liquid, the content, when the container is inverted, tends to fall down extremely less than that of the present invention as will be learned from the experimental results demonstrated in Examples appearing later. That is, if the inner surface of the container is formed of the olefin resin alone, the interface between the content and the inner layer of the container is a solid-liquid interface. On the other hand, if the inner surface of the container is coated with the lubricating liquid to a sufficient degree, the interface is a liquid-liquid interface (i.e., contacts over a large area to the fluid content), and the slipping property to the fluid content is very and strikingly improved.

Figure 1:
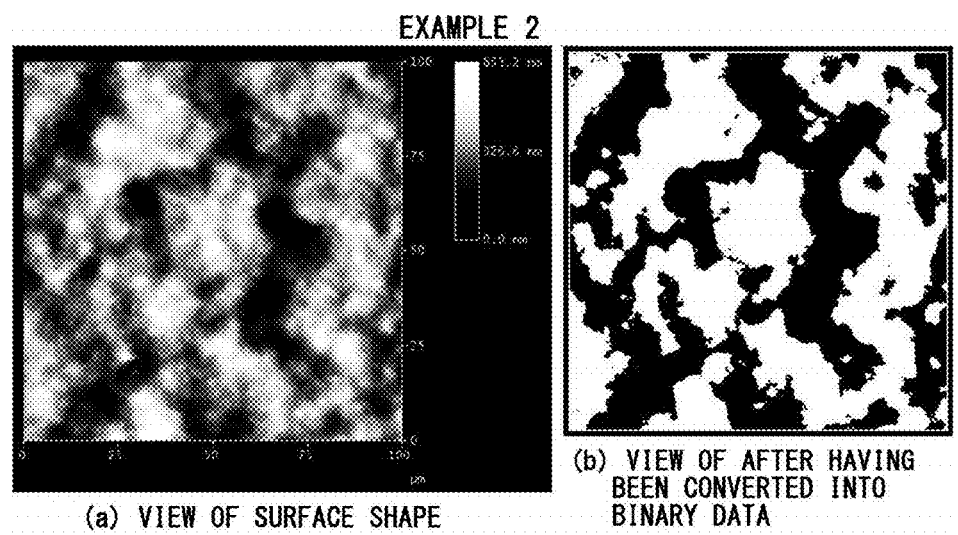
FIGS. 1(a) and 1(b) are views of surface shapes on the inner surface of a container (Example 2) of the present invention as measured by using the atomic force microscope (scanning range of 100 μm×100 μm).

At the time of forming, further, the resin is crystallized accompanied by the phase separation of the lubricating liquid, and the crystallization occurs at irregular rates in the surface of the container which is the formed body developing fine dents in the surface of the container. FIG. 1 is a view of surface shapes on the inner surface of a container of Example 2 as observed by using an atomic force microscope (100 μm×100 μm) from which black portions representing dents can be seen to be continuing. It is considered that at least part of the lubricating liquid exposed on the surface is present along the fine dents or is held in the dents. As a result, the lubricating liquid covering the surface is firmly held therein without falling down and stably maintains the slipping property. Moreover, since fine dents have been continuously formed over the whole inner surface, the lubricating liquid, even if it may not often be locally sufficient, is fed from other portions owing to dents that are continuously present. Therefore, even if there occurs a change in the temperature or a change due to contraction of the container, the surface can be effectively and continuously maintained coated with the lubricating liquid. For example, as described in Examples appearing later, the container is allowed to maintain excellent slipping property even when it is filled with the fluid content at a high temperature. As described above, the container which is formed accompanied by the phase separation of the lubricating liquid may be coated on its surface with the lubricating liquid in a segregated manner. In this case, too, the layer of the lubricating liquid is uniformly formed over the whole inner surface of the container as it is formed without almost causing the layer of the lubricating liquid to become irregular offering, therefore, a great advantage from such a standpoint that excellent slipping property is homogeneously exhibited over the whole inner surface of the container.

<Form of the Inner Surface of the Containers>

As described above, the container of the invention has an inner surface that comes in contact with the fluid content, the inner surface being formed of a resin composition containing a lubricating liquid. Therefore, the lubricating liquid is partly exposed on the inner surface of the container to exhibit slipping property. It is, therefore, necessary that the inner surface of the container has been coated with the exposed lubricating liquid to a certain degree.

The ratio F of covering the inner surface of the container with the lubricating liquid can be expressed by, for example, the following formula (1), $$F = (\cos \theta - \cos \theta_B)/(\cos \theta_A - \cos \theta_B)$$

wherein θ is a water contact angle on the surface (inner surface) of the container formed of the resin composition that forms the inner surface of the container, $\theta_A$ is a water contact angle on the immiscible liquid (lubricating liquid), and $\theta_B$ is a water contact angle on the forming-resin.

That is, when the water contact angle θ on the inner surface of the container is the same as the water contact angle $\theta_A$ on the lubricating liquid, the covering ratio F is 1.0; i.e., the whole inner surface of the container is covered with the lubricating liquid. In the present invention, it is desired that the covering ratio F is not less than 0.26 and, specifically, in a range of 0.30 to 1 and, more preferably, 0.35 to 0.91. The amount of the lubricating liquid in the resin composition is so set that the covering ratio F lies within the above-mentioned range (the amount of the lubricating liquid will be described later).

If the covering ratio F is too small, the slipping property is not exhibited to a sufficient degree for the fluid content. For instance, the packing material disclosed in the above-mentioned patent document 4 exhibits no slipping property to the fluid content presumably because the covering ratio is small and the surfactant that corresponds to the lubricating liquid is present only in spotted manner on the surface.

Further, if the covering ratio F is too great, inconvenience may arouse such as defective forming though there is no problem in regard to the slipping property.

In the present invention, further, being related to that the resin composition used for forming the container inner surface has been blended with the lubricating liquid, dents are finely and continuously formed in the container inner surface as will be obvious from the image of the atomic force microscope shown in FIG. 1 presumably contributing to stably maintaining the slipping property.

For instance, in case the covering factor with the lubricating liquid is achieved as described above, an average area of protuberances (white portions) as observed through the atomic force microscope is present at an area ratio of 50 to 200 μm$^2$ and, specifically, 50 to 170 μm$^2$ over a scanning range of 100 μm×100 μm as shown in FIG. 1. That is, the slipping property can be maintained stable over extended periods of time if protuberances having large areas are distributed at a suitable ratio (if protuberances having small areas are much present, dents tend to be isolated and, hence, the continuity of dents decreases), i.e., if dents are continuously distributed having large areas. In this case, further, the lubricating liquid exposed on the inner surface is prevented from falling down and favorable slipping property is maintained even when the container is filled with the fluid content at a high temperature.

Further, forming the dents is reflected by the surface roughness. For instance, when the surface covering ratio F with the lubricating liquid lies within the above-mentioned range or when the area ratio of dents is within the above-mentioned range, a mean square surface roughness RMS of the container inner surface is, usually, in a range of 80 to 200 nm as measured by using the atomic force microscope over a scanning range of 100 μm×100 μm, which is a very larger value than that of when the inner surface is not sufficiently covered with the lubricating liquid.

<Fluid Contents>

The content contained in the container of the present invention is a fluid substance and has no specific limitation so far as it exhibits fluidity without showing any property for holding the shape. Preferred examples thereof, usually, include viscous paste or slurry fluid substances (e.g., having a viscosity at 25° C. of not less than 100 cps), such as ketchup, aqueous paste, bee honey, sauces, semi-solid dressings (mayonnaise, creamy dressing for salads), emulsified liquid dressing, cosmetic liquids such as emulsion and the like, liquid detergent, shampoo, rinse and conditioner. That is, the container of the invention exhibits such favorable slipping property that even a viscous fluid substance can be quickly discharged without being adhered and left on the container inner surface when it is tilted or inverted.

The container of the present invention exhibits highly slipping property to specifically a content having a high viscosity among the above fluid substances enabling the content to fall down sliding along the container inner surface in short periods of time (high fall-down speed) and, further, enabling the content having a low viscosity to fall down thoroughly without remaining on the container inner surface.

Further, the fluid contents for which the container of the invention is used are, specifically, non-emulsion type aqueous materials such as ketchup and various kinds of sauces. That is, when an emulsion type fluid substance (typically mayonnaise) is contained as the content, favorable slipping property is exhibited in the initial stage. However, as the content containing a surfactant component is repetitively caused to move along the container inner surface, the lubricating liquid exposed on the container inner surface is gradually removed by the content though dependent upon the kind of the lubricating liquid that is contained, and the slipping property gradually decreases. Namely, the slipping property tends to be lost in relatively short periods of time. On the other hand, when the non-emulsion type aqueous substance is contained, the lubricating liquid is removed very little by the content, and good slipping property is exhibited maintaining stability even when the container is repetitively used over extended periods of time.

<Forms of the Containers>

Figure 4:
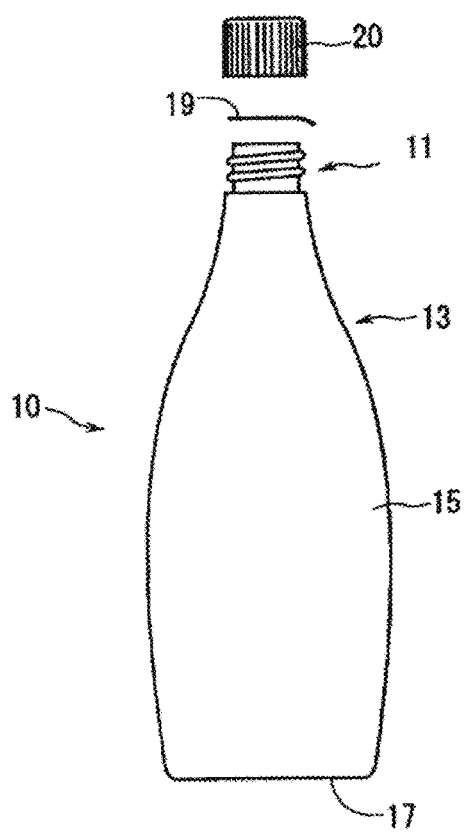
FIG. 4 is a view showing the appearance of a container of the present invention.

There is no limitation on the forms of the containers of the invention so far as they are forming an inner surface that comes in contact with the fluid content by using a resin composition that contains the resin for forming the containers and the lubricating liquid. Namely, the containers can assume various forms such as cup, cup-like form, bottle-like form, bag (pouch), syringe, pot, tray and the like, and may have been stretch-formed. FIG. 4 shows an example of when the present invention is applied to a plastic bottle. Not being limited thereto only, however, the containers of the invention may also be made of a glass, a paper or a metal.

Here, the container of the invention permits the content to slip excellently and, therefore, features very excellent discharge property for the content, such as inverted fall-down property for the content or preventing the content from adhering and remaining. Therefore, the container of the present invention is most desirably a direct blow molding bottle adapted to squeezing out the viscous content such as ketchup and the like.

Referring to, for example, FIG. 4, the bottle is generally designated at 10, and includes a neck portion 11 having a screw thread, a body wall 15 continuous to the neck portion 11 via a shoulder portion 13, and a bottom wall 17 that is closing the lower end of the body wall 15. After the bottle 10 is filled with a viscous content, the opening at the upper end of the neck portion 11 is heat-sealed with a metal foil 19 such as aluminum foil, and a predetermined cap 20 is fitted thereto so that the bottle is used as a packing bottle. To use the packing bottle, the cap 20 is removed, the metal foil 19 applied with a sealing member is peeled off, and the bottle 10 is tilted or inverted and, as required, the body wall 15 is squeezed to take out the content out of the container.

<Material (Resin Composition) Forming the Container Inner Surface>

In the invention, the resin composition that forms the container inner surface contains the container-forming resin and the lubricating liquid and, further, contains suitable additives as required.

1. Forming-Resin.

There is no particular limitation on the forming-resin if it can be formed into the container having the inner surface of the forming-resin. There can be used a variety of thermoplastics such as polyester as represented by polyethylene terephthalate and olefin resin depending on the forms of the containers.

Specifically, if the present invention is applied to the above-mentioned directly-blown bottle, there can be used, as the forming-resin, the known olefin resin such as low-density polyethylene, straight-chain low-density polyethylene, intermediate- or high-density polyethylene, polypropylene, poly 1-butene, or poly 4-methyl-1-pentene. It is allowable, as a matter of course, to use a random or block copolymer of α-olefins, such as ethylene, propylene, 1-butene or 4-methyl-1-pentene. It is, further, allowable to use a cyclic olefin copolymer disclosed in the above-mentioned patent document 1 (JP-A-2007-284066).

2. Lubricating Liquid.

As the lubricating liquid, there is used a liquid that is immiscible with the content. If miscible with the content, the lubricating liquid exposed on the container inner surface mixes with the content and separates away from the inner surface of the container.

Here, the liquid immiscible with the content is a liquid that is not miscible with the content. Roughly speaking, an oleophilic liquid is used for the aqueous content while water or a hydrophilic liquid is used for the oily content. As the lubricating liquid, in general, there may be used a liquid which enables the covering ratio F to lie within the above-mentioned range (not less than 0.26) when the container is filled with the content. Specifically, a high lubricating effect is realized and is suited for the invention when the liquid produces a surface tension for the inner surface of the container that is greatly different from a surface tension produced by the liquid for the content.

It is, further, desired that the liquid is nonvolatile, as a matter of course. Desirably, therefore, there is used a liquid that produces a vapor pressure so will not to be volatilized even when the container is being formed or in a state where the container is exposed to the atmosphere.

As the lubricating liquid that can be most favorably used for the water-containing content according to the present invention, there can be exemplified silicone oil, glycerin fatty acid ester, liquid paraffin (white oil) or edible fat and oil. Particularly preferred examples include glycerin fatty acid esters such as intermediate-chain fatty acid triglyceride, glycerin trioleate and glycerin diacetomonooleate, as well as liquid paraffin and edible fat and oil. They do not easily volatilize, have been approved as food additives and, besides, are odorless and do not damage flavor of the content, which are advantages.

For the oily contents, further, there can be used water or a highly hydrophilic ionic liquid.

As the lubricating liquid that can be favorably used for the emulsion type fluid substances, there can be exemplified silicone oil, glycerin fatty acid ester, liquid paraffin and edible fat and oil. Among them, the most desired is a lubricating liquid that emulsifies spending a period of time. Among the above-mentioned substances, the lubricating liquid that exhibits such a property is the one having a relatively large molecular weight. This is because the lubricating liquid having a small molecular weight also has small molecules that are subject to be entrapped by the emulsion type fluid substance (in short periods of time). For instance, most desirably, the silicone oil and liquid paraffin should have relatively large molecular weights, the glycerin fatty acid ester should have a large fatty acid group (not less than 8 carbon atoms in the fatty acid) and a large number of fatty acid groups that are substituted (e.g., diglyceride, triglyceride and, specifically, intermediate-chain fatty acid triglyceride, glycerin triol, etc.), and the edible fat and oil should have a large fatty acid group (not less than 16 carbon atoms in the chief fatty acid).

It is desired that the above lubricating liquid is added in an amount of not less than 3% by weight and, specifically, not less than 4% by weight relative to the resin composition in order to satisfy the covering ratio F lying in the above-mentioned range. This is because if the amount thereof is small, the covering ratio F decreases and it becomes difficult to maintain good slipping property on the inner surface of the container. If the lubricating liquid is added in unnecessarily large amounts, on the other hand, the formability is impaired or the container properties are adversely affected. Usually, therefore, the amount thereof is not more than 20% by weight and, specifically, not more than 10% by weight.

In order to attain a desired covering ratio or to form a desired liquid film, moreover, the lubricating liquid may, further, be applied onto the resin composition that has been blended with the lubricating liquid. Upon applying the lubricating liquid onto the resin composition that has already been blended with the lubricating liquid, it is allowed to prevent or suppress the lubricating liquid that is applied from diffusing onto the inner surface side of the container to thereby maintain stable properties.

3. Other Additives.

The above resin composition may be blended with various additives known per se., such as antioxidant, ultraviolet ray absorber or filler depending on the use of the containers. If no transparency is required, the resin composition may be blended with a coloring agent such as pigment or dye and, further, with crystallizing additives (inorganic oxide such as titanium oxide, various waxes, etc.).

However, the amounts of the additives should be maintained small so that the amount of the lubricating liquid in the composition is maintained in the above-mentioned range, that the formability of the forming-resin is not impaired and that the slipping property is not impaired on the inner surface of the container.

<Layer Structure of the Container>

The container of the present invention may have either a single-layer structure or a multi-layer structure so far as the inner surface of the container (part of the surface that comes in contact with the fluid content) is formed of a resin composition that contains the above-mentioned lubricating liquid. Basically, however, the inner layer of the container should have a multi-layer structure formed of the above-mentioned resin composition. That is, in the case of the single-layer structure formed of the above resin composition, the lubricating liquid contained in the resin composition is consumed also on the outer surface of the container. To maintain a sufficient degree of slipping property, therefore, the lubricating liquid becomes necessary in amounts larger than the required amount not only impairing formability and container property but also arousing such problems as stickiness and the like.

The multi-layer structure is such that the innermost layer is formed of the above-mentioned resin composition and the outermost layer is formed on the outer side thereof. As required, an intermediate layer may be formed between the two layers. The multi-layer structure can be applied not only to the directly blown bottles but also to the plastic containers (e.g., polyester containers) in the same manner. In the directly blown bottles, however, it is necessary that the whole thickness of the container wall has been so adjusted as to assure squeezing property.

In the case of the bottles for containing, for example, shampoos and conditioners, there can be employed the two-layer structure comprising the innermost layer of the above-mentioned resin composition and a layer on the outer side thereof of a high-density polyethylene.

Usually, the intermediate layer in the multi-layer structure is a gas-barrier layer formed, preferably, by using an ethylene/vinyl alcohol copolymer (saponified product of ethylene/vinyl acetate copolymer) or an aromatic polyamide and, specifically, by using an ethylene/vinyl alcohol copolymer. That is, by using a gas-barrier resin as the resin for forming the intermediate layer, it is allowed to impart oxygen-barrier property to the intermediate layer. Specifically, the ethylene/vinyl alcohol copolymer exhibits particularly excellent oxygen-barrier property and makes it possible to effectively suppress the content from being deteriorated by oxidation due to the permeation of oxygen, to maintain excellent slipping property and, at the same time, to maintain excellent preservability of the content.

The preferred thickness of the gas-barrier intermediate layer is, usually, in a range of 1 to 50 μm and, specifically, 9 to 40 μm.

If the above gas-barrier resin is to be used as the intermediate layer, it is desire that the intermediate layer is provided via adhesive resin layers in order to enhance adhesion to the inner and outer layers and to prevent delamination. Thus the intermediate layer can be firmly adhered to the inner and outer layers. Adhesive resins used for forming the adhesive resin layers have been known per se. For example, there is used a resin that contains, in the main chain or the side chain thereof, the carbonyl groups ($>C=O$) in an amount of 1 to 100 meq/100 g of the resin and, specifically, in an amount of 10 to 100 meq/100 g of the resin. Concretely, as the adhesive resin, there is used an olefin resin graft-modified with a carboxylic acid such as maleic acid, itaconic acid or fumaric acid or an anhydride thereof, or with an amide or an ester; an ethylene-acrylic acid copolymer; an ionically crosslinked olefin copolymer; or an ethylene-vinyl acetate copolymer. The adhesive resin layers may have a thickness that produces a suitable degree of adhering force and, usually, a thickness of about 0.5 to about 20 μm and, preferably, about 1 to about 8 μm.

In the container having the above multi-layer structure, a regrind layer may be formed neighboring the outermost layer or the innermost layer by mixing the scrap resin that generates at the time of forming the containers and the virgin resin for forming the outermost layer. In this case, it is desired that the amount of the scrap resin is about 10 to about 60 parts by weight per 100 parts by weight of the outermost virgin layer from the standpoint of reusing resources yet maintaining formability. The thickness of the layer neighboring the outermost layer may vary depending on the size of the packing container or the kind of the content, but should be such that the thickness of the container wall as a whole does not become unnecessarily large and that the scrap resin can be effectively utilized, and is, usually, set to be about 20 to about 200 μm.

<Forming the Containers and Filling the Content>

A container and, specifically, a packing container for preserving the content for long periods of time, is formed by using the above-mentioned resin composition and a resin or a resin composition for forming layers other than the inner surface, by forming a preform such as pipe, test tube, sheet or film by the extrusion molding or the injection molding that has been known per se. depending on the shape of the container, and by forming the preform into the container in the form of a bottle, cup or bag by the blow forming, the vacuum forming such as plug-assist forming or by the secondary forming or the secondary working such as sticking in the form of a bag. With the direct-blow forming, in particular, a preform in the shape of a pipe having a predetermined layer structure is blow-formed with its one end closed to obtain a container.

In the case of the containers such as cups and trays for temporarily containing the contents, the containers are directly formed by the extrusion molding or the injection molding.

The containers of the present invention formed as described above are capable of directly containing the contents therein without conducting the after-treatment, specifically, with the lubricating liquid. Therefore, the containers can be produced in high yields. Further, since the innermost layer holding the lubricating liquid is firmly adhered to the neighboring base material, there is no such probability that the innermost layer may peel off providing a very high degree of safety.

In the case of the packing containers for preserving the contents for long periods of time, further, a hot-filling method is employed depending on the kinds of the fluid contents (e.g., sauce and ketchup) to fill the containers with the content while heating it at a high temperature (70° C. or higher) to, at the same time, sterilize the content. When the hot-filling method is employed, too, the container of the present invention maintains excellent slipping property for extended periods of time, which is a great advantage of the present invention.

EXAMPLES

The invention will now be described by way of Examples.

Described below are a variety of properties, methods of measuring properties and resins used for forming the containers (bottles) in Examples described below.

In the following measurement, the solid-liquid interface analyzer that was used was a solid-liquid interface analysis system, DropMaster 700, (manufactured by Kyowa Kaimen Kagaku Co.).

1. Measuring the Covering Ratio with Immiscible Liquid.

A test piece measuring 10 mm×60 mm was cut out from the body portion of a bottle of a volume of 500 g prepared by a method described later. Under a condition of 23° C. 50% RH and by using the solid-liquid interface analyzer, the test piece was fixed thereto in a manner that the inner layer of the test piece was facing upward. Three microliters of pure water was placed on the test piece to measure the water contact angle $\theta$. By using the obtained water contact angle, a covering ratio F with the lubricating liquid on the inner surface of the bottle was found according to the following formula (1), $$F=(\cos\theta-\cos\theta_B)/(\cos\theta_A-\cos\theta_B) \quad (1)$$

wherein $\theta$ is a water contact angle on the container surface (inner surface) formed of the resin composition that forms the container inner surface, $\theta_A$ is a water contact angle on the immiscible liquid (lubricating liquid), and $\theta_B$ is a water contact angle on the forming-resin.

In finding the covering ratio F with the lubricating liquid, the following water contact angles were used as the values $\theta_A$ and $\theta_B$.

$\theta_B$: 100.1° (value of a high-pressure low-density polyethylene (MFR=0.3) alone)

$\theta_A$: 80.3° (value of an intermediate-chain fatty acid triglyceride on a liquid film)

$\theta_A$: 59.6° (value of a glycerin diacetomonooleate on a liquid film)

$\theta_A$: 77.7° (value of a glycerin trioleate on a liquid film)

2. Measuring the Slip-Down Speed of the Content.

A Kewpie-Half (Japanese Agricultural Standards: Creamy Dressing for Salads, manufactured by Kewpie Co.) was used as the sample content in the container.

A test piece measuring 20 mm×70 mm was cut out from the body portion a bottle of a volume of 500 g formed by the method described later. Under the condition of 23° C. 50% RH and by using the solid-liquid interface analyzer, the test piece was fixed thereto in a manner that the inner layer of the test piece was facing upward. 70 Milligrams of the Kewpie-Half was placed on the test piece, the falling behavior on an inclination of 45° was photographed by using a camera, the falling behavior was analyzed, and the falling speed was calculated from the plots of moving distance vs. time. The falling speed was used as an index of falling property. The larger the value of the falling speed, the more excellently the content falls down.

3. Testing the Amount Remaining in the Bottle.

As sample contents in the container, there were used (A) Okonomi Sauce (manufactured by Otafuku Sauce Co.) and (B) Kewpie-Half (manufactured by Kewpie Co.).

The bottle of a volume of 500 g formed by the method described later was fully filled with (A) the Okonomi Sauce or (B) the Kewpie-Half as the content, and was hermetically sealed with a sealing foil. The temperature of the content at the time of filling was 70° C. when (A) the Okonomi Sauce was filled and 23° C. when (B) the Kewpie-Half was filled.

After the bottle has been filled with the content, the sealing foil was removed from the bottle, a cap was fitted thereto, and 400 g of the content was squeezed out at room temperature. Thereafter, the bottle was inverted and was left to stand at room temperature for 2 hours.

After left to stand, the squeezing operation was repeated for every 2 minutes with the bottle being inverted and, after 20 minutes have passed, the weight (weight of the content remaining+weight of the bottle) was measured. After the measurement, the content remaining in the bottle was washed away with water, the bottle after washed was measured for its weight, and a difference in the weight was found and was regarded to be the remaining amount. The smaller the remaining amount, the more excellent the slipping property on the inner surface of the bottle.

4. Measuring the Ratio of Inner Layers of the Bottle.

By using a polarization microscope, the layer constitution was observed on the horizontal cross section of the body portion at a position 50 mm above the bottom of the multilayer bottle formed by the method described later to thereby find the layer constitution in the body portion of the bottle. The layer constitution was observed at positions of 0°, 90°, 180° and 270° relative to the cross section, and an average value in the four directions was regarded to be the layer constitution of the bottle.

5. Measuring the Shapes of the Inner Surfaces of the Bottles.

The inner surface of the body portion of the multilayer bottle formed by the method described later was measured for its surface shape by using an atomic force microscope (NanoScope III, manufactured by Digital Instruments Co.). The measuring conditions were as described below.

Cantilever: resonance frequency $f_0$=363 to 392 kHz, spring constant k=20 to 80 N/m
Measuring mode: tapping mode
Scanning rate: 0.6671 Hz
Scanning range: 100 μm×100 μm
Number of scanning lines: 256

A mean square surface roughness RMS was found from the obtained data of the three-dimensional shape. By using a software (Nanoscope: Version 5.30r2) attached to the atomic force microscope, the data of the three-dimensional shape were converted into binary data of the portions (dents) lower than the center surface and of the portions (protuberances) higher than the center surface to obtain the two-dimensional data to thereby calculate the distribution of higher portions (protuberances) (i.e., to calculate the number of protuberances and average area thereof). Here, the portions (dents) lower than the center surface are shown in black and the portions (protuberances) higher than the center surface are shown in white.

<Properties of the Fluid Contents>

Kewpie-Half (produced by Kewpie Co., viscosity=1260 mPa·s)
Okonomi Sauce (produced by Otafuku Co., Viscosity=560 mPa·s)

Here, the contents were measured for their viscosities at 25° C. by using a tuning fork oscillator type viscometer SV-10 (manufactured by A & D Co.).

Example 1

The following resins were provided for forming the layers.

Resin for Forming the Innermost Layer:
A resin composition comprising a high-pressure low-density
polyethylene (LDPE, MFR=0.3) and an intermediate-chain fatty acid triglyceride at a ratio of 97/3 (wt %).

Resin for Forming the Outermost Layer:
Low-density polyethylene (LDPE)
MFR: 0.3 g/10 min.
Density: 0.92 g/cm$^3$ Resin for Forming the Second Inner Layer:
Low-density polyethylene (LDPE)
MFR: 0.3 g/10 min.
Density: 0.92 g/cm$^3$ Resin for Forming the Adhesive Layers:
Maleic anhydride-modified polyethylene Resin for Forming the Gas-Barrier Layer:
Ethylene-vinyl alcohol copolymer
(density, 1.19 g/cm$^3$; Tg, 69° C.)

A five-kind-six-layer multilayer bottle having a volume of 500 g and weighing 20 g was prepared by a known direct-blow-molding method at a metal mold temperature of 20° C. by feeding the innermost layer-forming resin pellets to a 30-mm extruder, feeding the outermost layer-forming resin pellets to a 40-mm extruder, feeding the second inner layer-forming resin pellets to a 50-mm extruder, feeding the adhesive layer-forming resin pellets to a 30-mm extruder A, feeding the gas-barrier layer-forming resin pellets to a 30-mm extruder B, and by extruding a molten parison through a multilayer die head heated at 210° C.

The thus prepared bottle was measured for its covering ratio with the immiscible liquid, content slip-down speed, amount of the content remaining in the bottle and shape of the inner surface of the bottle. The results were as shown in Table 1.

The layer constitution in the body portion of the bottle was as follows:
Outermost layer: 60 μm
Adhesive layer: 10 μm
Gas-barrier layer: 20 μm
Adhesive layer: 10 μm
Second inner layer: 250 μm
Innermost layer: 110 μm (innermost layer ratio, 24%)

Example 2

As the resin for forming the innermost layer, there was provided a resin composition comprising the high-pressure low-density polyethylene (MFR=0.3) and the intermediate-chain fatty acid triglyceride at a ratio of 95/5 (wt %).

A multilayer bottle was formed in the same manner as in Example 1 but changing the resin for forming the innermost layer into the above composition. The innermost layer ratio in the body portion of the bottle was 24%.

The thus prepared bottle was measured for its covering ratio with the immiscible liquid, content slip-down speed, amount of the content remaining in the bottle and shape of the inner surface of the bottle. The results were as shown in Table 1.

FIG. 1 shows the measured results of the shape of the inner surface of the bottle. FIG. 1 (a) shows an image of before being converted into binary data and FIG. 1 (b) shows an image of after having been converted into binary data.

Example 3

As the resin for forming the innermost layer, there was provided a resin composition comprising the high-pressure low-density polyethylene (MFR=0.3) and the glycerin trioleate at a ratio of 97/3 (wt %).

A multilayer bottle was formed in the same manner as in Example 1 but changing the resin for forming the innermost layer into the above composition. The innermost layer ratio in the body portion of the bottle was 22%.

The thus prepared bottle was measured for its covering ratio with the immiscible liquid and content slip-down speed. The results were as shown in Table 1.

Example 4

As the resin for forming the innermost layer, there was provided a resin composition comprising the high-pressure low-density polyethylene (MFR=0.3) and the glycerin trioleate at a ratio of 95/5 (wt %).

A multilayer bottle was formed in the same manner as in Example 1 but changing the resin for forming the innermost layer into the above composition. The innermost layer ratio in the body portion of the bottle was 22%.

The thus prepared bottle was measured for its covering ratio with the immiscible liquid, content slip-down speed and amount of the content remaining in the bottle. The results were as shown in Table 1.

Example 5

As the resin for forming the innermost layer, there was provided a resin composition comprising the high-pressure low-density polyethylene (MFR=0.3) and the glycerin diacetomonooleate at a ratio of 97/3 (wt %).

A multilayer bottle was formed in the same manner as in Example 1 but changing the resin for forming the innermost layer into the above composition. The innermost layer ratio in the body portion of the bottle was 22%.

The thus prepared bottle was measured for its covering ratio with the immiscible liquid and content slip-down speed. The results were as shown in Table 1.

Example 6

As the resin for forming the innermost layer, there was provided a resin composition comprising the high-pressure low-density polyethylene (MFR=0.3) and the glycerin diacetomonooleate at a ratio of 95/5 (wt %).

A multilayer bottle was formed in the same manner as in Example 1 but changing the resin for forming the innermost layer into the above composition. The innermost layer ratio in the body portion of the bottle was 22%.

The thus prepared bottle was measured for its covering ratio with the immiscible liquid, content slip-down speed and amount of the content remaining in the bottle. The results were as shown in Table 1.

Example 7

As the resin for forming the innermost layer, there was provided a resin composition comprising the high-pressure low-density polyethylene (MFR=0.3), the linear low-density polyethylene (LLDPE, MFR=2.2, melting point=60° C., lowly crystalline) and the intermediate-chain fatty acid triglyceride at a ratio of 82/15/3 (wt %).

A multilayer bottle was formed in the same manner as in Example 1 but changing the resin for forming the innermost layer into the above composition. The innermost layer ratio in the body portion of the bottle was 25%.

The thus prepared bottle was measured for its covering ratio with the immiscible liquid, content slip-down speed, amount of the content remaining in the bottle and shape of the inner surface of the bottle. The results were as shown in Table 1.

Example 8

As the resin for forming the innermost layer, there was provided a resin composition comprising the high-pressure low-density polyethylene (MFR=0.3), the linear low-density polyethylene (LLDPE, MFR=2.2, melting point=60° C., lowly crystalline) and the intermediate-chain fatty acid triglyceride at a ratio of 80/15/5 (wt %).

A multilayer bottle was formed in the same manner as in Example 1 but changing the resin for forming the innermost layer into the above composition. The innermost layer ratio in the body portion of the bottle was 25%.

The thus prepared bottle was measured for its covering ratio with the immiscible liquid, content slip-down speed, amount of the content remaining in the bottle and shape of the inner surface of the bottle. The results were as shown in Table 1.

Example 9

As the resin for forming the innermost layer, there was provided a resin composition comprising the high-pressure low-density polyethylene (MFR=0.3), the linear low-density polyethylene (LLDPE, MFR=2.2, melting point=60° C., lowly crystalline) and the intermediate-chain fatty acid triglyceride at a ratio of 67/30/3 (wt %).

A multilayer bottle was formed in the same manner as in Example 1 but changing the resin for forming the innermost layer into the above composition. The innermost layer ratio in the body portion of the bottle was 25%.

The thus prepared bottle was measured for its covering ratio with the immiscible liquid, content slip-down speed, amount of the content remaining in the bottle and shape of the inner surface of the bottle. The results were as shown in Table 1.

Example 10

As the resin for forming the innermost layer, there was provided a resin composition comprising the high-pressure low-density polyethylene (MFR=0.3), the linear low-density polyethylene (LLDPE, MFR=2.2, melting point=60° C., lowly crystalline) and the intermediate-chain fatty acid triglyceride at a ratio of 65/30/5 (wt %).

A multilayer bottle was formed in the same manner as in Example 1 but changing the resin for forming the innermost layer into the above composition. The innermost layer ratio in the body portion of the bottle was 25%.

The thus prepared bottle was measured for its covering ratio with the immiscible liquid, content slip-down speed, amount of the content remaining in the bottle and shape of the inner surface of the bottle. The results were as shown in Table 1.

Comparative Example 1

A multilayer bottle was formed in the same manner as in Example 1 but using the high-pressure low-density polyethylene (MFR=0.3) as the resin for forming the innermost layer. The innermost layer ratio in the body portion of the bottle was 24%.

The thus prepared bottle was measured for its covering ratio with the immiscible liquid, content slip-down speed, amount of the content remaining in the bottle and shape of the inner surface of the bottle. The results were as shown in Table 1.

Figure 2:
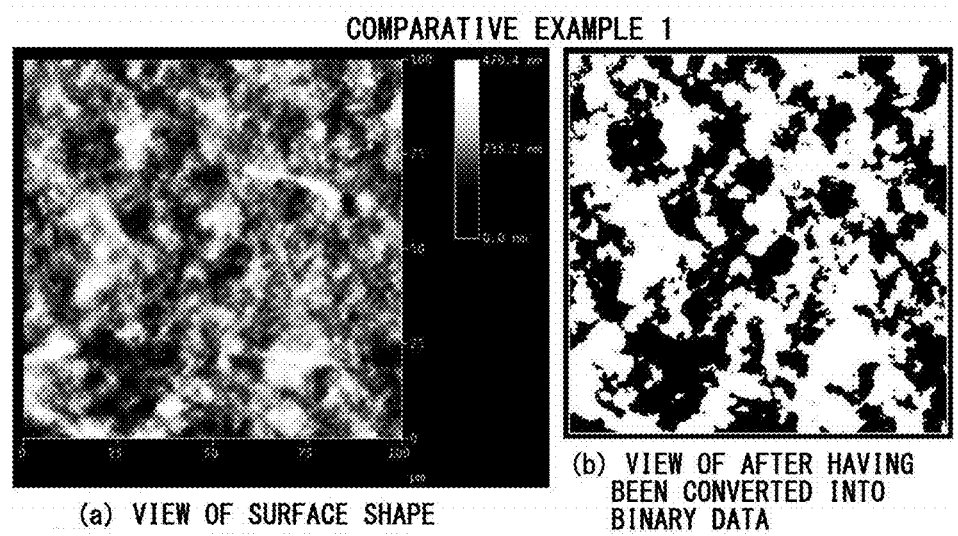
FIG. 2 is a view of surface shapes on the inner surface of a container (Comparative Example 1) formed by using a resin composition without containing the lubricating liquid as measured by using the atomic force microscope.

FIG. 2 shows the measured results of the shape of the inner surface of the bottle. FIG. 2 (a) shows an image of before being converted into binary data and FIG. 2 (b) shows an image of after having been converted into binary data.

Comparative Example 2

As the resin for forming the innermost layer, there was provided a resin composition comprising the high-pressure low-density polyethylene (MFR=0.3) and the intermediate-chain fatty acid triglyceride at a ratio of 99.9/0.1 (wt %).

A multilayer bottle was formed in the same manner as in Example 1 but changing the resin for forming the innermost layer into the above composition. The innermost layer ratio in the body portion of the bottle was 24%.

The thus prepared bottle was measured for its covering ratio with the immiscible liquid, content slip-down speed, amount of the content remaining in the bottle and shape of the inner surface of the bottle. The results were as shown in Table 1.

Comparative Example 3

As the resin for forming the innermost layer, there was provided a resin composition comprising the high-pressure low-density polyethylene (MFR=0.3) and the intermediate-chain fatty acid triglyceride at a ratio of 99.5/0.5 (wt %).

A multilayer bottle was formed in the same manner as in Example 1 but changing the resin for forming the innermost layer into the above composition. The innermost layer ratio in the body portion of the bottle was 24%.

The thus prepared bottle was measured for its covering ratio with the immiscible liquid, content slip-down speed, amount of the content remaining in the bottle and shape of the inner surface of the bottle. The results were as shown in Table 1.

Comparative Example 4

As the resin for forming the innermost layer, there was provided a resin composition comprising the high-pressure low-density polyethylene (MFR=0.3) and the intermediate-chain fatty acid triglyceride at a ratio of 99/1 (wt %).

A multilayer bottle was formed in the same manner as in Example 1 but changing the resin for forming the innermost layer into the above composition. The innermost layer ratio in the body portion of the bottle was 23%.

The thus prepared bottle was measured for its covering ratio with the immiscible liquid, content slip-down speed, amount of the content remaining in the bottle and shape of the inner surface of the bottle. The results were as shown in Table 1.

Comparative Example 5

As the resin for forming the innermost layer, there was provided a resin composition comprising the high-pressure low-density polyethylene (MFR=0.3) and the intermediate-chain fatty acid triglyceride at a ratio of 98/2 (wt %).

A multilayer bottle was formed in the same manner as in Example 1 but changing the resin for forming the innermost layer into the above composition. The innermost layer ratio in the body portion of the bottle was 23%.

The thus prepared bottle was measured for its covering ratio with the immiscible liquid, content slip-down speed, amount of the content remaining in the bottle and shape of the inner surface of the bottle. The results were as shown in Table 1.

Figure 3:
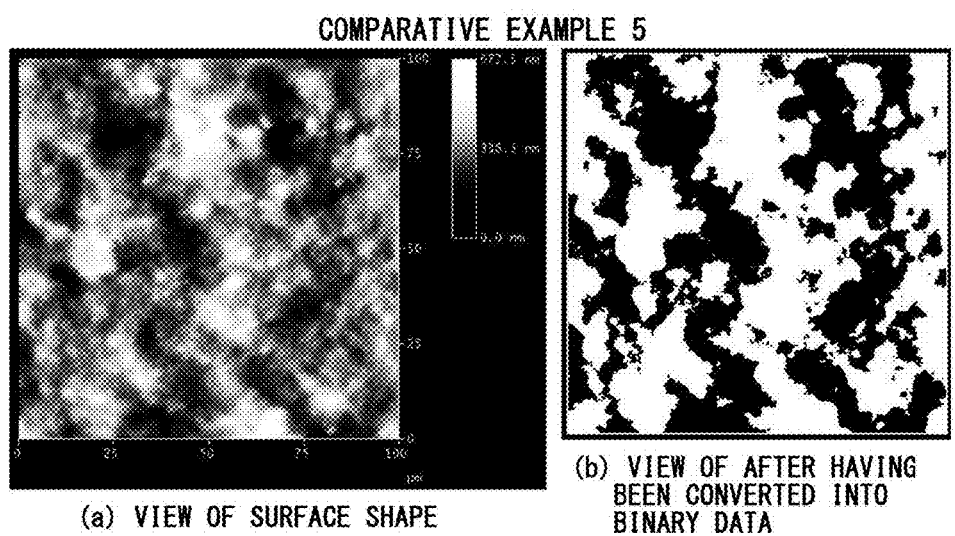
FIG. 3 is a view of surface shapes on the inner surface of a container (Comparative Example 5) formed by using a resin composition of which the surface has not been sufficiently coated as measured by using the atomic force microscope.

FIG. 3 shows the measured results of the shape of the inner surface of the bottle. FIG. 3 (a) shows an image of before being converted into binary data and FIG. 3 (b) shows an image of after having been converted into binary data.

TABLE 1

| | Constitution of resin composition of the surface to where the content comes in contact (wt %) | | | | | Liquid covering ratio F | Content slip-down speed mm · min$^{-1}$ |
|---|---|---|---|---|---|---|---|
| | LDPE | LLDPE | Intermediate-chain fatty acid triglyceride | Glycerin trioleate | Diaceto-monooleate | | |
| Example 1 | 97 | | 3 | | | 0.36 | 1.88 |
| Example 2 | 95 | | 5 | | | 0.46 | 3.26 |
| Example 3 | 97 | | | 3 | | 0.37 | 1.81 |
| Example 4 | 95 | | | 5 | | 0.80 | 3.06 |
| Example 5 | 97 | | | | 3 | 0.74 | 1.55 |
| Example 6 | 95 | | | | 5 | 1 | 6.62 |
| Example 7 | 82 | 15 | 3 | | | 0.26 | 1.27 |
| Example 8 | 80 | 15 | 5 | | | 0.91 | 6.79 |
| Example 9 | 67 | 30 | 3 | | | 0.29 | 1.02 |
| Example 10 | 65 | 30 | 5 | | | 0.91 | 6.80 |
| Comp. Ex. 1 | 100 | | | | | 0 | 0.34 |
| Comp. Ex. 2 | 99.9 | | 0.1 | | | 0.03 | 0.16 |
| Comp. Ex. 3 | 99.5 | | 0.5 | | | 0.05 | 0.21 |
| Comp. Ex. 4 | 99 | | 1 | | | 0.09 | 0.22 |
| Comp. Ex. 5 | 98 | | 2 | | | 0.25 | 0.25 |

| | Remaining amount in the bottle (g) | | Measurement of surface shape (100 μm × 100 μm) | | |
|---|---|---|---|---|---|
| | (A) Okonomi sauce | (B) Kewpie-Half | Number of protuberances | Ave. area of protuberances μm$^2$ | RMS nm |
| Example 1 | — | 4.9 | 97 | 54.18 | 87.9 |
| Example 2 | 4.9 | 6.2 | 83 | 63.12 | 88.8 |
| Example 3 | — | — | — | — | — |
| Example 4 | 6.3 | — | — | — | — |
| Example 5 | — | — | — | — | — |
| Example 6 | 3.0 | — | — | — | — |
| Example 7 | — | 4.7 | 81 | 62.55 | 84.8 |
| Example 8 | — | 3.3 | 32 | 161.71 | 164.8 |
| Example 9 | — | 5.5 | 67 | 75.92 | 134.2 |
| Example 10 | — | 5.1 | 32 | 159.45 | 138.7 |
| Comp. Ex. 1 | 11.4 | 9.5 | 161 | 33.46 | 52.0 |
| Comp. Ex. 2 | 10.9 | 10.1 | 152 | 35.76 | 48.4 |
| Comp. Ex. 3 | 10.8 | 9.3 | 139 | 38.15 | 72.3 |
| Comp. Ex. 4 | 11.0 | 8.0 | 101 | 49.50 | 94.7 |
| Comp. Ex. 5 | 12.3 | 7.9 | 118 | 46.01 | 77.3 |

(Consideration)

It is learned from Table 1 above if the liquid covering ratio is not more than 0.25 on the surface that comes in contact with the content, the content slip-down speed is small and the slipping property is poor. If the liquid covering ratio is not less than 0.26, on the other hand, the content slip-down speed increases and the slipping property becomes very favorable. From the results of testing the amounts remaining in the bottles, further, if the container has the liquid covering ratio of not less than 0.26 on the surface that comes in contact with the content, the amount of the content that remains becomes smaller than the amount that remains in the container having the liquid covering ratio of not more than 0.25. In this case, therefore, the slipping property works effectively to efficiently decrease the remaining amount of the content.

FIG. 2 shows the shape of the inner surface of the bottle of when the composition contains no liquid in the surface that comes in contact with the content. In this case, fine ruggedness is confirmed, but small dents are distributed or are present in very large amounts.

FIG. 3 shows the shape of the inner surface of the bottle of when the liquid covering ratio is 0.25 on the surface that comes in contact with the content. In this case, it is confirmed that the dents are having sizes larger than those of FIG. 2. However, it is also confirmed that the dents are much isolated and are little continuous. Namely, it is considered that the liquid has not been held in amounts sufficient for covering the surface of the inner layer of the container.

FIG. 1 shows the shape of the inner surface of the bottle of when the liquid covering ratio is 0.46 on the surface that comes in contact with the content. In this case, it is confirmed that the isolated dents are decreased as compared to those of FIG. 3, and the dents are very much continuing.

From these Figures, it is learned that if the liquid covering ratio is large, the dents become highly continuous. The resin composition for forming the innermost layer of the container comprises only the forming-resin and the liquid. It is, therefore, considered that at the time of forming the container, the dents are formed in the surface as the forming-resin and the liquid undergo the phase separation.

DESCRIPTION OF REFERENCE NUMERALS

10: multilayer plastic container (bottle)
11: neck portion
13: shoulder portion
15: body wall
17: bottom wall
19: metal foil
20: cap

The invention claimed is:

1. A container for containing fluid substance as a content, wherein:
   a container surface that comes in contact with said content is formed of a resin composition that contains a forming-resin and an immiscible-liquid that is immiscible with said fluid substance;
   the container contains a fluid substance as a content;
   the fluid substance contained as said content has a viscosity at 25° C. of not less than 100 cps;
   the resin composition forms an inner surface of the container that comes in contact with said content, and contains the liquid immiscible with the content in an amount of not less than 3% by weight;
   the container has a multilayered structure on condition that the inner surface of the container that comes in contact with said content is formed of said resin composition; and
   a covering ratio F with the immiscible-liquid is not less than 0.26, the covering ratio F being represented by the following formula (1), $$F = (\cos\theta - \cos\theta_B)/(\cos\theta_A - \cos\theta_B) \quad (1)$$

wherein θ is a water contact angle on the container surface formed of said resin composition,
$\theta_A$ is a water contact angle on the immiscible liquid, and
$\theta_B$ is a water contact angle on the forming-resin.

2. The container according to claim 1, wherein when the container surface formed of the resin composition is measured for its shape by using an atomic force microscope, dents that are denting over a scanning range of 100 μm×100 μm are observed, and in a binary image of high portions (protuberances) and low portions (dents) with the center surface as reference converted from the surface profile that is obtained, the average area of protuberances over said scanning range is not less than 50 μm².

3. The container according to claim 2, wherein in the surface shape profile obtained by scanning the range of 100 μm×100 μm by using the atomic force microscope, the container surface formed of the resin composition has a mean square surface roughness MRS represented by the following formula (2), $$\text{RMS} = \sqrt{\frac{1}{n}\sum_{i}^{n}(Z(i) - Z_{ave})^2} \quad (2)$$

wherein n is a number of data points,
Z(i) is a Z value at each of the data points, and
Zave is an average value of all Z values,
in a range of 80 nm to 200 nm.

4. The container according to claim 1, wherein a polyolefin is used as the resin for forming.

5. The container according to claim 1, wherein the fluid substance used as said content is a non-emulsifying aqueous substance.

6. The container according to claim 5, wherein said non-emulsifying aqueous substance is a ketchup or sauce.

7. The container according to claim 5, wherein a silicone oil, a glycerin fatty acid ester, a liquid paraffin or an edible fat and oil is used as said immiscible liquid.

8. The container according to claim 1, wherein said resin composition is, further, coated with an immiscible liquid.

* * * * *